US012594617B2

(12) United States Patent
Hanada et al.

(10) Patent No.: US 12,594,617 B2
(45) Date of Patent: Apr. 7, 2026

(54) WELDING METHOD, IDENTIFICATION SIGN ASSIGNMENT DEVICE, AND WELDMENT

(71) Applicant: Panasonic Intellectual Property Management Co., Ltd., Osaka (JP)

(72) Inventors: Kazuki Hanada, Osaka (JP); Takamichi Komatsu, Osaka (JP); Hisashi Kataoka, Osaka (JP); Kazuyuki Nakashima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 974 days.

(21) Appl. No.: 17/716,234

(22) Filed: Apr. 8, 2022

(65) Prior Publication Data

US 2022/0226923 A1 Jul. 21, 2022

Related U.S. Application Data

(63) Continuation of application No. PCT/JP2020/037365, filed on Sep. 30, 2020.

(30) Foreign Application Priority Data

Oct. 11, 2019 (JP) ................................. 2019-188154

(51) Int. Cl.
| | |
|---|---|
| *B23K 9/095* | (2006.01) |
| *B25J 9/16* | (2006.01) |
| *B25J 11/00* | (2006.01) |

(52) U.S. Cl.
CPC .......... *B23K 9/0953* (2013.01); *B23K 9/0956* (2013.01); *B25J 9/163* (2013.01);
(Continued)

(58) Field of Classification Search
CPC ...... B23K 9/0953; B23K 9/0956; B25J 9/163; B25J 9/1653; B25J 9/1697; B25J 11/005
See application file for complete search history.

(56) References Cited

U.S. PATENT DOCUMENTS

| | | | |
|---|---|---|---|
| 8,742,280 B2 | 6/2014 | Vogel | |
| 10,399,778 B1 * | 9/2019 | Shekhawat | .......... B65G 1/1373 |

(Continued)

FOREIGN PATENT DOCUMENTS

| | | |
|---|---|---|
| EP | 3 417 975 | 12/2018 |
| FR | 3 076 754 | 7/2019 |

(Continued)

OTHER PUBLICATIONS

Extended European Search Report issued Oct. 18, 2022 in corresponding European Patent Application No. 20874959.8.

(Continued)

*Primary Examiner* — Elizabeth M Kerr
*Assistant Examiner* — Keith Brian Assante
(74) *Attorney, Agent, or Firm* — Wenderoth, Lind & Ponack, L.L.P.

(57) ABSTRACT

A welding method is executed by a welding system in which identification signs are arranged on a plurality of original workpieces to be used in a welding process, respectively. On the identification signs, identifiers of the respective original workpieces are readable. The welding method includes executing the welding process such that a part or an entire of the identification signs is hidden in a joint surface on which the plurality of original workpieces are joined in the welding process.

11 Claims, 8 Drawing Sheets

(52) U.S. Cl.
CPC .......... *B25J 9/1653* (2013.01); *B25J 9/1697* (2013.01); *B25J 11/005* (2013.01)

(56) References Cited

U.S. PATENT DOCUMENTS

| | | | |
|---|---|---|---|
| 2009/0173726 A1* | 7/2009 | Davidson ............. | B23K 9/0953 219/130.01 |
| 2011/0198329 A1* | 8/2011 | Davidson ................ | G06F 16/22 219/136 |
| 2013/0206741 A1* | 8/2013 | Pfeifer .................... | G01S 17/58 356/28 |
| 2014/0042137 A1 | 2/2014 | Daniel et al. | |
| 2016/0267806 A1 | 9/2016 | Hsu et al. | |
| 2017/0153616 A1 | 6/2017 | Sakakibara et al. | |
| 2018/0290302 A1* | 10/2018 | Wang ..................... | B25J 9/1664 |
| 2019/0015920 A1* | 1/2019 | Knoener .............. | B23K 9/0956 |
| 2019/0314919 A1* | 10/2019 | Daniel ................. | B23K 9/1062 |
| 2020/0254572 A1* | 8/2020 | Becker ................. | B23K 9/0953 |
| 2021/0016440 A1* | 1/2021 | Cassidy ................. | B25J 9/1664 |
| 2021/0027659 A1* | 1/2021 | Becker ................. | B23K 9/0953 |
| 2021/0046642 A1* | 2/2021 | Luis y Prado ....... | B25J 11/0055 |

FOREIGN PATENT DOCUMENTS

| | | |
|---|---|---|
| JP | 2000-137512 | 5/2000 |
| JP | 2008-059116 | 3/2008 |
| JP | 5638464 | 12/2014 |
| JP | 2017-021563 | 1/2017 |
| JP | 2017-102548 | 6/2017 |
| JP | 6192321 | 9/2017 |
| JP | 2017-177181 | 10/2017 |
| WO | 2015/200487 | 12/2015 |

OTHER PUBLICATIONS

International Search Report issued Nov. 10, 2020 in International (PCT) Application No. PCT/JP2020/037365 with English translation.

Written Opinion of the International Searching Authority issued Nov. 10, 2020 in International (PCT) Application No. PCT/JP2020/037365.

* cited by examiner

XTB1

| SELECTION ID | MANAGEMENT ID |
|---|---|
| AAA001 | RX85 - 100 1 |
| BBB001 | RX85 - 100 2 |
| DD D001 | RX90 - 0001 |
| ⋮ | ⋮ |

WELDING METHOD, IDENTIFICATION SIGN ASSIGNMENT DEVICE, AND WELDMENT

CROSS-REFERENCE TO RELATED APPLICATIONS

This application is a continuation of PCT International Patent Application No. PCT/JP2020/037365 filed on Sep. 30, 2020, which claims the benefit of priority of Japanese Patent Application No. 2019-188154 filed on Oct. 11, 2019, the entire contents of which are incorporated herein by reference.

FIELD

The present disclosure relates to a welding method, an identification sign assignment device, and a weldment.

BACKGROUND

JP-A-2017-102548 discloses a production management device that manages production performance information on a production line in which a plurality of production machines are arranged. The production management device detects which production machine a workpiece supplied to the production line is located in, generates an identifier unique to the workpiece when it is detected that the workpiece is located in any production machine, notifies the production machine in which the workpiece is located, and receives and records the generated identifier and the production performance information at the time of processing the workpiece corresponding to the identifier from the production machine. Each time the workpiece is sequentially moved to each of a plurality of production machines, the production management device records a plurality of identifiers generated for the workpiece and identifiers of products completed by the workpiece in association with each other.

SUMMARY

The present disclosure provides a welding method that supports more efficient management of an identifier of a workpiece produced in a process such as welding, an identification sign assignment device, and a weldment.

The present disclosure provides a welding method to be executed by a welding system, wherein identification signs are arranged on a plurality of original workpieces to be used in a welding process, respectively, the identification signs on which identifiers of the respective original workpieces are readable, the welding method including: executing the welding process such that a part or an entire of an identification sign is hidden in a joint surface on which the plurality of original workpieces are joined in the welding process.

The present disclosure provides an identification sign assignment device configured to assign identification signs to a plurality of original workpieces to be used in a welding process executed by a welding system, respectively, the identification sign assignment device including: a communication unit configured to acquire welding information including information on identifiers of the respective original workpieces and information on an identifier that is not selected as an identifier of a welded workpiece to be produced in the welding process among the identifiers of the plurality of original workpieces; and a processor configured to control a laser oscillator, the laser oscillator being configured to assign the identification signs based on the received welding information, the identification signs on which information on the identifiers corresponding to the respective original workpieces are readable. The identification signs are assigned such that a part or an entire of an identification sign of an original workpiece having the identifier that is not selected as the identifier of the welded workpiece is located on a joint surface on which the plurality of original workpieces are joined by the welding process.

The present disclosure provides a weldment produced by execution of a welding process by a welding system, the weldment being produced by: a process of arranging identification signs on a plurality of original workpieces to be used in a welding process, the identification signs on which identifiers of the respective original workpieces are readable; and a process of executing the welding process so as to hide a part or an entire of an identification sign assigned at a position of a joint surface on which the plurality of original workpieces are joined in the welding process.

According to the present disclosure, it is possible to support more efficient management of an identifier of a workpiece produced in a process such as welding.

DETAILED DESCRIPTION (Introduction to Present Disclosure)

Figure 1:
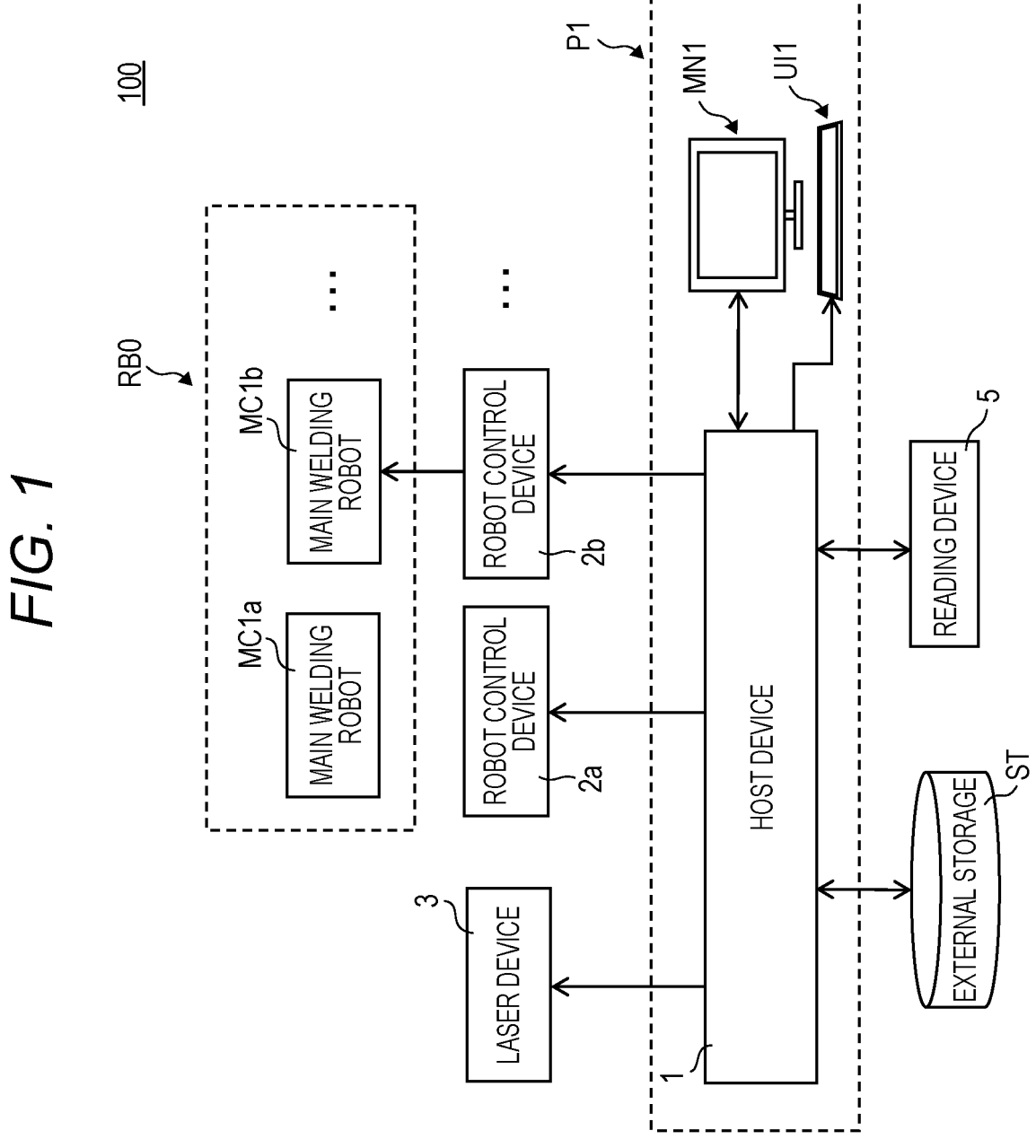
FIG. 1 is a schematic diagram showing a system configuration example of a welding system.

According to JP-A-2017-102548, a production management device can manage traceability data for each workpiece. However, in the configuration of JP-A-2017-102548, different identifiers are newly assigned each time the same workpiece is located in a plurality of different production machines. In other words, each time one workpiece is sequentially located on another production machine in a production line, the one workpiece has a plurality of different identifiers. Therefore, for example, when a plurality of workpieces are joined and another workpiece is produced as in a welding process, if a new identifier is assigned to the produced workpiece in accordance with JP-A-2017-102548, a relationship between an identifier of the workpiece used in the welding process and an identifier of the produced workpiece may be complicated, and thus it may be difficult to use traceability related to the produced workpiece. That is, management of the identifier of the workpiece is complicated, and work efficiency of a system administrator is deteriorated.

Therefore, in the following embodiments, examples of a welding method, an identification sign assignment device, and a weldment that support more efficient management of the identifier of the workpiece produced in a process such as welding will be described.

Hereinafter, embodiments specifically disclosing a welding method, an identification sign assignment device, and a weldment according to the present disclosure will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided to enable those skilled in the art to fully understand the present disclosure, and are not intended to limit the range of the claims.

First Embodiment

The welding system according to the first embodiment acquires information on identifiers of a plurality of original workpieces, and selects an identifier to be adopted as an identifier of a produced welded workpiece (that is, a weldment, the same shall apply hereinafter.) according to a predetermined rule based on completion of execution of a welding process using the plurality of original workpieces. The welding system sets the selected identifier as the identifier of the welded workpiece produced in the welding process. Hereinafter, the workpiece used in the welding process is defined as an "original workpiece", and the workpiece produced in the welding process (that is, the weldment) is defined as a "welded workpiece". The "welded workpiece" may be referred to as a "secondary workpiece" or an "n-th workpiece" (n: an integer of 2 or more).

(Configuration of Welding System)

FIG. 1 is a schematic diagram showing a system configuration example of a welding system 100. The welding system 100 includes a host device 1 connected to each of an external storage ST, an input interface UI1, and a monitor MN1, a plurality of robot control devices (for example, robot control devices 2a and 2b), a plurality of main welding robots (for example, main welding robots MC1a and MC1b), a laser device 3, and a reading device 5. The robot control device 2a is provided corresponding to the main welding robot MC1a, the robot control device 2b is provided corresponding to the main welding robot MC1b, and the same number of robot control devices are similarly provided corresponding to one main welding robot. The number of the laser devices 3 and the number of the reading devices 5 are not limited to one, and may be plural.

The host device 1 is connected to the monitor MN1, the input interface UI1, the laser device 3, the reading device 5, and the external storage ST so as to be able to input and output data, and is further connected to each of the plurality of robot control devices 2a, 2b, and so on so as to be able to communicate data. The host device 1 may include a terminal device P1 integrally including the monitor MN1 and the input interface UI1, and may further integrally include the external storage ST. In this case, the terminal device P1 is a personal computer (PC) used by a user business operator prior to execution of a welding process (for example, main welding). The terminal device P1 is not limited to the PC described above, and may be a computer device having a communication function, such as a smartphone or a tablet terminal.

The host device 1 stores design data for each original workpiece or each welded workpiece input by the user business operator in the memory 12 or the external storage ST. The design data is data created using a design support tool such as computer aided design (CAD). The host device 1 acquires information on a joint surface of a welded workpiece based on workpiece-related information including information on a welding portion and a joint surface of the main welding (so-called welding process) executed by the main welding robots MC1a, MC1b, and so on, information on a supplier, information on a specification of the workpiece, and the like, and design data, and selects an ID of the welded workpiece (for example, a secondary workpiece, and a welded workpiece produced by two or more welding processes) from IDs of a plurality of original workpieces used for production of the welded workpiece in advance according to a predetermined rule.

The host device 1 acquires the design data of each of the plurality of original workpieces, and sets an arrangement position of an identification sign on which an ID of the original workpiece selected as an ID of the welded workpiece produced in a predetermined welding process is readable so as to be assigned at a position readable after the predetermined welding process. On the other hand, the host device 1 sets the identification sign on which an ID of the original workpiece unselected as the ID of the welded workpiece produced in the predetermined welding process is readable so that the identification sign is assigned in the joint surface on which the plurality of original workpieces are joined in the predetermined welding process at a position where the identification sign cannot be read. Further, the host device 1 generates a pattern of the identification sign assigned to each of the plurality of original workpieces, and stores the pattern in the external storage ST in association with the ID of each of the plurality of original workpieces. The host device 1 generates an execution command for assigning an identification sign having the generated pattern to the arrangement position of the identification sign set for each of the plurality of original workpieces, and transmits the execution command to the laser device 3. The host device 1 may store the IDs of the plurality of original workpieces, the patterns of the identification signs on which the IDs can be read, and the information on the arrangement positions of the identification signs in the external storage ST in association with each other.

Here, the identification sign is an identification sign on which the ID set for the original workpiece or the welded workpiece is readable, and is, for example, a two-dimensional barcode, a QR code (registered trademark), a barcode, an IC tag, or an RF tag. The identification sign may be directly arranged (that is, marked) on the workpiece by a laser, or may be arranged by attaching the IC tag or the RF tag. The identification sign may be directly arranged (that is, marked) on the original workpiece by the laser device 3, or may be arranged by attaching the IC tag or the RF tag by another robot (not shown).

The arrangement positions of the respective identification signs of the original workpiece set by the host device 1 will be described. The identification sign of the original workpiece having the ID unselected as the ID of the welded workpiece produced by the execution of the predetermined welding process is partially or entirely hidden on the joint surface to be joined by the execution of the predetermined welding process, and is arranged at an arrangement position that is unreadable after the execution of the predetermined welding process. When the code itself has an error correction function of restoring data when a part of the code is stained or lost, for example, a two-dimensional barcode, the host device 1 sets the arrangement position so that the error correction function of the identification code is disabled, that is, a part or an entire of the identification sign is assigned in the joint surface. Accordingly, the welding system 100 according to the first embodiment can prevent the identification sign of the original workpiece having the ID that is not erroneously selected from being read.

When the process of arranging the identification signs by the laser device 3 is completed, the host device 1 proceeds to the process of main welding using the workpiece on which the identification signs are arranged. The host device 1 integrally controls the execution of the main welding (so-called welding process) executed by the corresponding main welding robots MC1a, MC1b, and so on via each of the plurality of robot control devices 2a, 2b, and so on. For example, the host device 1 reads, from the external storage ST, welding-related information input or set in advance by the user business operator (for example, a welding operator or a system administrator. The same applies hereinafter), generates a welding process execution command including a part of contents of the welding-related information based on the welding-related information, and transmits the generated execution command to the corresponding robot control device (for example, the robot control device 2a). The execution command of the main welding described above is not limited to being generated by the host device 1, and may be generated by, for example, an operation panel (for example, a programmable logic controller (PLC)) of equipment in a factory or the like in which the main welding is performed, or an operation panel (for example, a teach Pendant (TP)) of the robot control devices 2a, 2b, and so on. The teach pendant (TP) is a device for operating the main welding robots MC1a, MC1b, and so on connected to the robot control devices 2a, 2b, and so on.

Here, the welding-related information is information indicating the content of the welding process executed for each main welding robot, and is created in advance for each welding process and registered in the external storage ST. The welding-related information includes, for example, the number of original workpieces required for the welding process, an identifier (hereinafter, abbreviated as "ID") of the original workpiece used in the welding process, workpiece information including a name and a welding portion of the original workpiece, an execution scheduled date on which the welding process is scheduled to be executed, the number of welded workpieces, and various welding conditions at the time of the welding process. The welding-related information is not limited to data of items described above. The robot control device (for example, the robot control device 2a) causes the main welding robot (for example, the main welding robot MC1a) to perform the welding process using the plurality of original workpieces designated by the execution command based on the execution command transmitted from the host device 1. In the present specification, the type of the welding process is not limited, but in order to make the description easy to understand, a process of joining each of the plurality of original workpieces will be described as an example (see FIG. 4).

The host device 1 acquires the above-described welding-related information from the external storage ST, generates the welding process execution command using the plurality of original workpieces based on the welding-related information, and transmits the execution command to the corresponding robot control devices 2a, 2b, and so on. When the host device 1 is notified of the completion of the welding process from the corresponding robot control devices 2a, 2b, and so on after the completion of the welding process by each of the main welding robots MC1a, MC1b, and so on, the host device 1 generates welding process logical data (see FIG. 4) corresponding to the welding workpiece produced by the welding process.

When the welding process logical data corresponding to the welded workpiece is generated, the host device 1 stores the ID of the welded workpiece, the welding process logical data, and a management ID (see FIG. 6) used by the user business operator in the external storage ST in association with each other. At this time, the host device 1 associates the workpiece-related information and the welding-related information on the unselected original workpiece with the ID of the unselected original workpiece indicated by the welding process logical data, and stores the information in the external storage ST. Accordingly, the host device 1 can appropriately manage the ID of the original workpiece having the ID unselected as the ID of the welded workpiece after the execution of the welding process, and can produce the weldment in which only one identification sign readable as the ID of the welded workpiece is arranged. Therefore, the user business operator limits the number of identification signs to be read at the time of reading the ID of the welded workpiece to one, thereby facilitating the ID management of the welded workpiece. Such a method of assigning the identification sign is more useful for the welded workpiece produced by executing a plurality of welding processes.

The host device 1 receives pattern information on the identification sign read by the reading device 5 from the reading device 5 capable of reading the identification sign arranged for each of the original workpiece and the welded workpiece. Based on the received pattern information on the identification sign, the host device 1 acquires information on the ID set for the original workpiece or the welded workpiece read by the reading device 5 from the external storage ST, and transmits the information to the reading device 5. Here, the information acquired by the host device 1 is not limited to the information on the IDs set for the plurality of original workpieces or welded workpieces, and may include, for example, workpiece-related information, welding-related information, welding process logical data, and management IDs (see FIG. 6) stored in association with the IDs.

The monitor MN1 may be configured with a display device such as a liquid crystal display (LED) or an organic electroluminescence (EL). The monitor MN1 may display, for example, a screen indicating the welding process logical data including the ID of the welded workpiece, which is output from the host device 1. Instead of the monitor MN1 or together with the monitor MN1, a speaker (not shown) may be connected to the host device 1, and the host device 1 may output the ID included in the welding process logical data by voice via the speaker.

The input interface UI1 is a user interface that detects an input operation of the user business operator and outputs the input operation to the host device 1, and may be configured using, for example, a mouse, a keyboard, or a touch panel. The input interface UI1 receives, for example, an input operation when the user business operator creates the workpiece-related information or the welding-related information, or an input operation when a welding process execution command is transmitted to the robot control device 2a.

The laser device 3 as an example of the identification sign assignment device is a device that assigns the identification sign to the workpiece based on an execution instruction received from the host device 1. In the welding system 100 according to the first embodiment, an example in which the identification sign is assigned to the workpiece by the laser device 3 will be described, whereas the device to which the identification sign is assigned is not limited to the laser device 3. For example, when the identification sign is assigned by attaching to a workpiece such as the IC tag or the RF tag, the laser device 3 may be omitted, and the attachment of the IC tag or the RF tag may be implemented by another robot (not shown).

The reading device 5 is a device that reads the identification sign assigned to each workpiece and outputs information on the ID set for the original workpiece or the welded workpiece, and may include, for example, a camera, a charge coupled device (CCD) sensor, or a laser. The reading device 5 may be a terminal device capable of reading the identification sign by the operation of the user business operator, or may be a device that is provided in a robot that executes the welding process or a robot that executes an inspection of the welding portion and is capable of reading the identification sign based on a control command of the host device 1 before and after the welding process or the inspection process. The reading device 5 transmits the pattern information on the read identification sign to the host device 1. The reading device 5 displays (outputs) the ID of the original workpiece or the welded workpiece received from the host device 1. The reading device 5 may output the ID of the original workpiece or the welded workpiece by voice.

The external storage ST is configured using, for example, a hard disk drive (HDD) or a solid state drive (SSD). The external storage ST stores, for example, pattern information on the identification sign assigned to each workpiece, data of workpiece-related information created for each workpiece, data of welding-related information created for each welding process, and welding process logical data (see FIG. 4) including the ID of the welded workpiece produced by the welding process.

The robot control devices 2a, 2b, and so on are connected so as to be able to communicate data with the host device 1, and are connected so as to be able to communicate data with each of the main welding robots MC1a, MC1b, and so on. When the robot control devices 2a, 2b, and so on receive the welding process execution command sent from the host device 1, the robot control devices 2a, 2b, and so on control the corresponding main welding robots MC1a, MC1b, and so on based on the execution command to execute the welding process. When detecting the completion of the welding process, the robot control devices 2a, 2b, and so on generate a welding completion notification indicating the completion of the welding process and transmit the welding completion notification to the host device 1. Accordingly, the host device 1 can appropriately detect the completion of the welding process based on each of the robot control devices 2a, 2b, and so on. The method of detecting the completion of the welding process by the robot control devices 2a, 2b, and so on may be a method of determining the completion of the welding process based on a signal indicating the completion of the welding process from a sensor (not shown) included in, for example, a wire feeding device 300, or may be a known method, and a content of the method of detecting the completion of the welding process is not limited.

The main welding robots MC1a, MC1b, and so on as an example of the welding robot are connected to the robot control devices 2a, 2b, and so on so as to be able to communicate data with the robot control devices 2a, 2b, and so on. The main welding robots MC1a, MC1b, and so on execute the welding process instructed by the host device 1 under the control of the corresponding robot control devices 2a, 2b, and so on.

Figure 2:
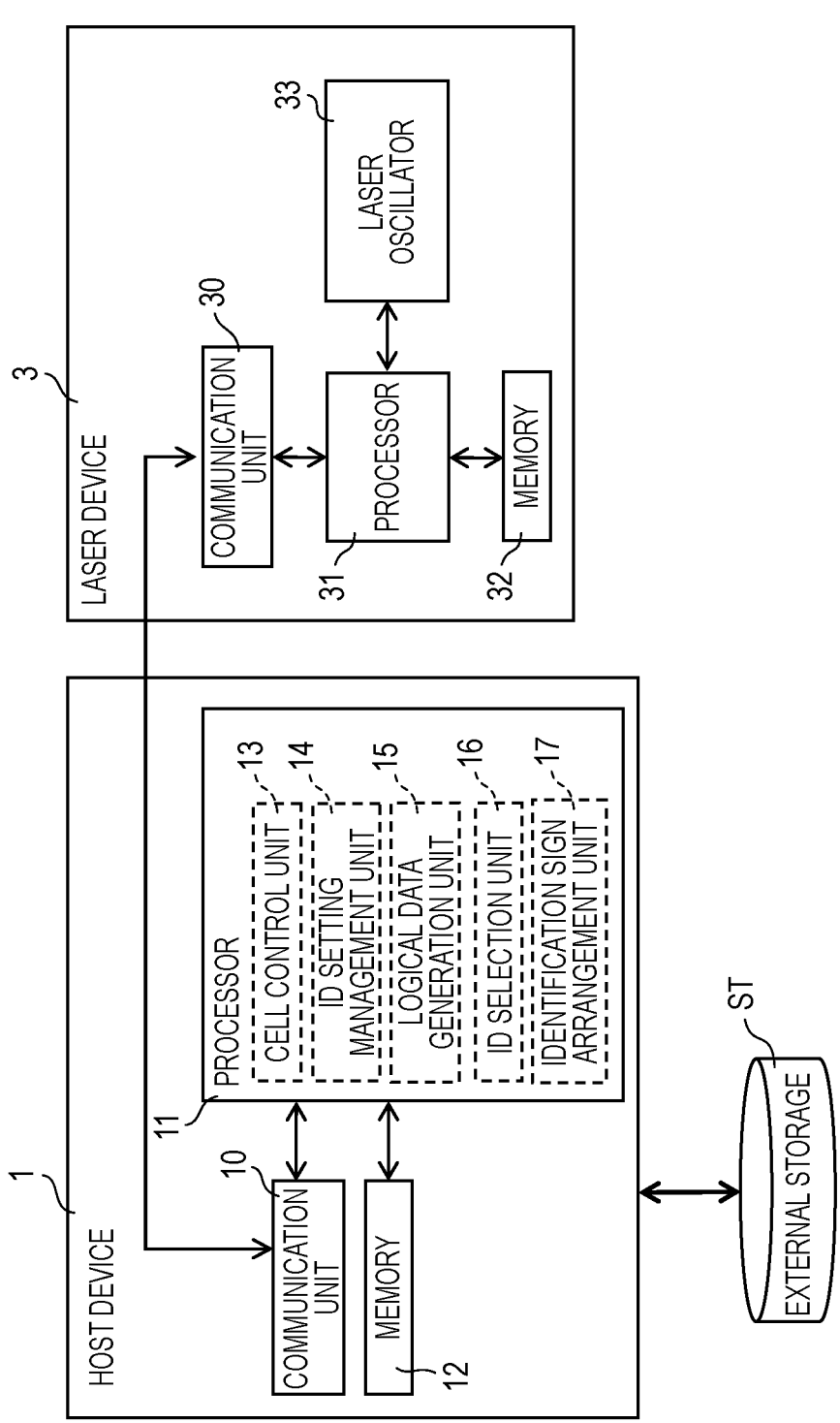
FIG. 2 is a diagram showing an internal configuration example of a host device and a laser device according to a first embodiment.
Figure 3:
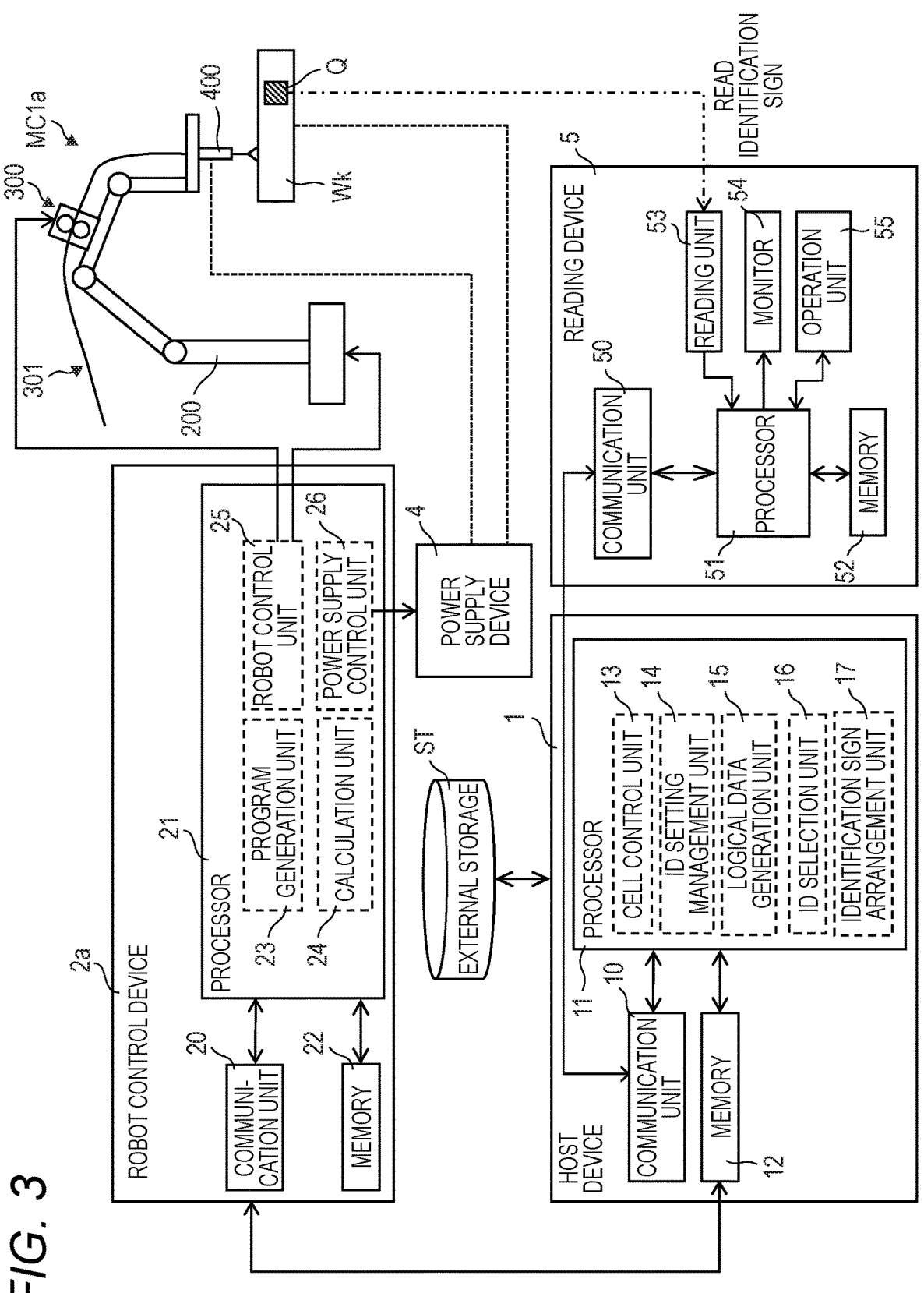
FIG. 3 is a diagram showing an internal configuration example of the host device, a robot control device, and a reading device according to the first embodiment.

FIG. 2 is a diagram showing an internal configuration example of the host device 1 and the laser device 3 according to the first embodiment. In order to make the description easy to understand, in FIG. 2, illustration of the monitor MN1, the input interface UI1, the main welding robots MC1a, MC1b, and so on, the robot control devices 2a, 2b, and so on, and the reading device 5 is omitted, and a process of assigning an identification sign Q before the welding process (hereinafter, referred to as an identification sign assigning process) will be described. FIG. 3 is a diagram showing an internal configuration example of the host device 1, the robot control device 2a, and the reading device 5 according to the first embodiment. In order to make the description easy to understand, the monitor MN1 and the input interface UI1 are not shown in FIG. 3, the main welding robot MC1a among the main welding robots MC1a, MC1b, and so on is exemplified, and further, the robot control device 2a among the robot control devices 2a, 2b, and so on is exemplified, and the welding process executed after the identification sign assigning process will be described.

The host device 1 in the identification sign assigning process transmits, to the laser device 3, an execution command for assigning the identification sign Q generated by using the design data of the original workpiece and the welded workpiece input in advance by the user business operator and information on the original workpiece having the ID selected as the ID of the welded workpiece. The host device 1 in the welding process generates the welding process execution command using each of the plurality of original workpieces by using the welding-related information input or set in advance by the user business operator, and transmits the execution command to the robot control device 2a. The host device 1 includes at least a communication unit 10, a processor 11, and a memory 12.

The processor 11 is configured using, for example, a central processing unit (CPU) or a field programmable gate array (FPGA), and performs various processing and control in cooperation with the memory 12. Specifically, the processor 11 functionally implements a cell control unit 13, an ID setting management unit 14, a logical data generation unit 15, and an ID selection unit 16 by referring to a program held in the memory 12 and executing the program.

The memory 12 includes, for example, a random access memory (RAM) as a workpiece memory used when processing of the processor 11 is executed, and a read only memory (ROM) for storing a program defining processing of the processor 11. The RAM temporarily stores data generated or acquired by the processor 11. A program that defines processing of the processor 11 is written into the ROM. The memory 12 stores the data of the workpiece-related information and the welding-related information read from the external storage ST, information on the arrangement position of the identification sign Q and information on the pattern, data of secondary workpiece information (see the following description) including the ID of the selected welded workpiece (secondary workpiece), and the welding process logical data (see FIG. 4) of the secondary workpiece generated by the processor 11.

The cell control unit 13 generates the execution command for executing the welding process using the plurality of original workpieces defined (in other words, set) in the welding-related information based on the welding-related information stored in the external storage ST. The cell control unit 13 may generate a different welding process execution command for each welding process executed by each of the main welding robots MC1*a*, MC1*b*, and so on. The welding process execution command generated by the cell control unit 13 is transmitted to the corresponding robot control devices 2*a*, 2*b*, and so on via the communication unit 10.

The ID setting management unit 14 sets the ID of the welded workpiece (secondary workpiece) output from the ID selection unit 16 to include information on the ID of the original workpiece unselected as the ID of the welded workpiece, and stores the information in the memory 12. The ID setting management unit 14 may store, in the external storage ST, the workpiece-related information on the unselected original workpiece in association with the ID of the original workpiece unselected as the ID of the welded workpiece, which is included in the welding process logical data (see the following description) generated along with the completion of the welding process for producing the welded workpiece (secondary workpiece).

Figure 4:
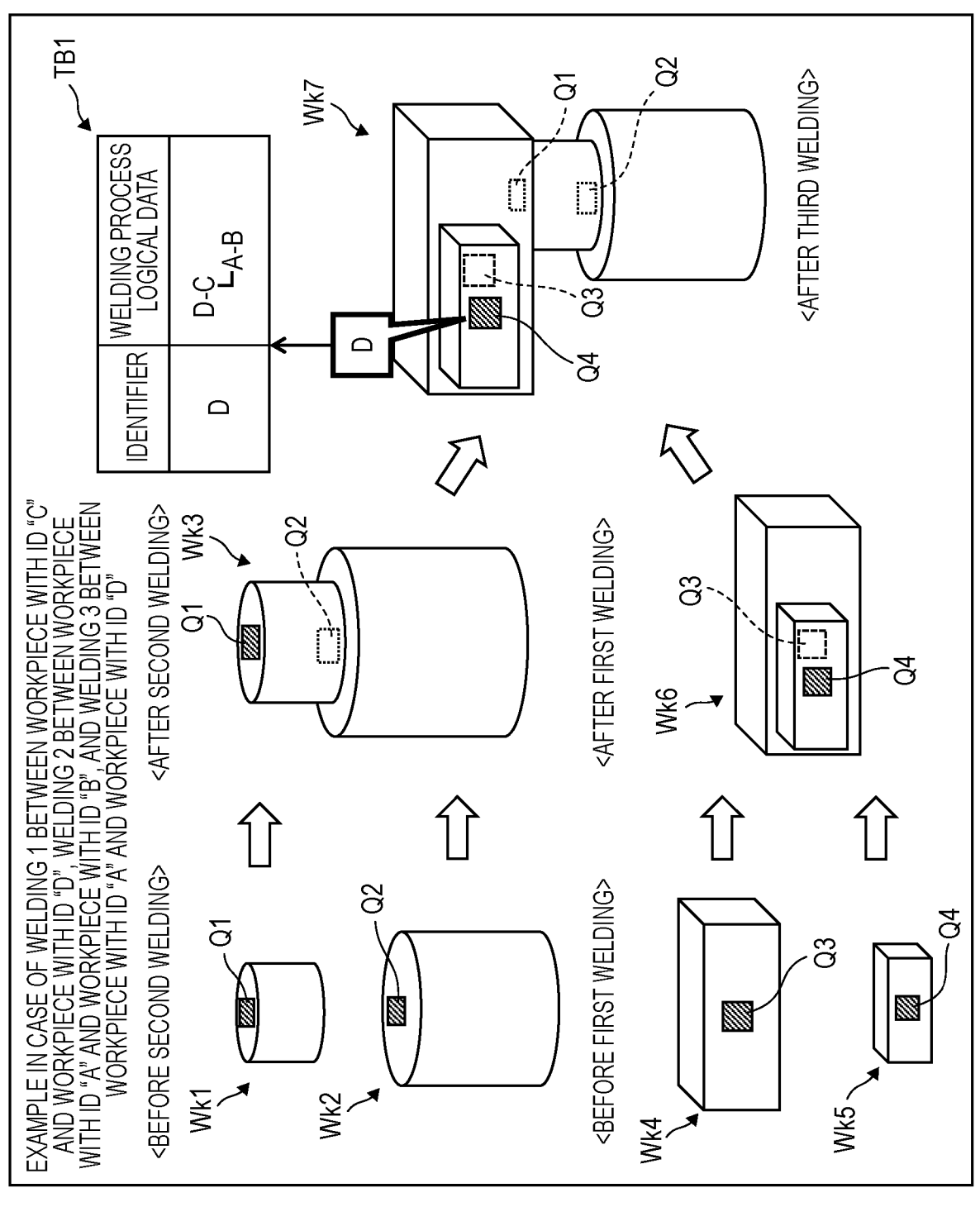
FIG. 4 explanatory diagram showing an example of an operation outline at the time of welding using a workpiece with an ID "A", a workpiece with an ID "B", a workpiece with an ID "C", and a workpiece with an ID "D".

The logical data generation unit 15 uses the secondary workpiece information including the ID of the welded workpiece (secondary workpiece) transmitted from the robot control device (for example, the robot control device 2*a*) to generate the welding process logical data indicating a relationship between the ID of the secondary workpiece and the ID of each of the plurality of original workpieces used in the welding process (for example, a temporal order in which the welding process is performed on each of the plurality of original workpieces) (see FIG. 4). Details of the welding process logical data will be described later with reference to FIG. 4. The logical data generation unit 15 may store the ID of the welded workpiece (secondary workpiece), the ID of the original workpiece which is used for production of the welded workpiece and unselected as the ID of the welded workpiece, and the welding process logical data (see FIG. 4) in the external storage ST in association with the information on the identification sign Q.

The ID selection unit 16 determines the ID of the welded workpiece (secondary workpiece) according to a predetermined rule in the identification sign assigning process. Here, the ID and the predetermined rule will be described. The predetermined rule used for the selection of the ID is a rule for selecting any ID among the IDs of the plurality of original workpieces used for the production of the welded workpiece for each welding process, and is a rule for selecting based on ID strength (that is, the ID is strong and the ID is weak), a rule for selecting the IDs of the workpiece and the workpiece having a small influence (for example, heat) due to the execution of the welding process based on the welding-related information, a rule for selecting the IDs of the workpiece and the workpiece in which the identification sign Q is easily read in the welded workpiece (so-called weldment) produced for each welding process, or the like, and any rule may be selected by the user business operator. The ID selection unit 16 stores the ID of the original workpiece selected as the ID of the welded workpiece and the ID of the original workpiece unselected as the ID of the welded workpiece for each welding process in the memory 12, and outputs the IDs to an identification sign arrangement unit 17.

In the present specification, the ID is constituted by, for example, a combination of a plurality of types of character codes. The types are, for example, alphabets and numbers, and are not limited thereto. For example, "ABC001XYZ999" is indicated as the ID of the original workpiece. Here, in order to make the description easy to understand, the ID is shown as a 12-digit character code formed of "three digits of alphabets", "three digits of numerals", "three digits of alphabets", and "three digits of numerals", whereas the ID is not limited to the configuration examples. Among the 12-digit character codes, for example, the upper three digits of alphabets may indicate codes of a company or a customer (for example, a supplier or a shipping destination), and other "three digits of numerals", "three digits of alphabets", and "three digits of numerals" may indicate serial numbers. The numbers of digits of numbers and alphabets are not limited to the same number of digits, and different numbers of digits such as a character code formed of "two digits of alphabets" and "three digits of alphabets" may be set.

A rule for selecting the ID of the welded workpiece (secondary workpiece) according to ID strength will be described. As for the ID, the following two strength rules are defined as rules indicating the ID strength (that is, the ID is strong and the ID is weak). Hereinafter, the two strength rules will be described.

In a first strength rule, the ID selection unit 16 sets a division between an alphabet and a number for the ID of the original workpiece, and compares the strength of each part of the division. In a second strength rule, the ID selection unit 16 determines that, in one division between the alphabet or the number, the strength is stronger as the order of the alphabets is earlier and the strength is stronger as the number is larger. For example, it is determined that "A" is stronger than "B" in the alphabet and "2" is stronger than "1" in the number.

As a modification of the second strength rule, the ID selection unit 27 may determine that, in one division between the alphabet or the number, the strength is stronger as the order of the alphabets is later and the strength is stronger as the number is smaller. For example, it may be determined that "B" is stronger than "A" in the alphabet and "1" is stronger than "2" in the number.

Here, "ABC001XYZ999" and "ABD002XYW998" are shown as the IDs of the original workpieces to be compared. For example, the ID selection unit 16 provides divisions "ABC", "001", "XYZ", and "999" for the ID "ABC001XYZ999", and similarly provides divisions "ABD", "002", "XYW", and "998" for the ID "ABD002XYW998".

For example, the ID selection unit 16 compares the IDs of the segment parts provided in order from upper digits of the ID at any time, and determines that "ABC" is stronger than "ABD", "001" is weaker than "002", "XYZ" is weaker than "XYW", and "999" is weaker than "998". Furthermore, the ID selection unit 16 gives priority to the one with the stronger ID in the division of the upper digits and determines that the ID as a whole is strong. This is because, for example, the "alphabet" used in the upper digit of the ID does not often define the type of the original workpiece. Therefore, the ID selection unit 16 determines that the ID "ABC001XYZ999" is stronger than the ID "ABD002XYW998". The above described strength rule is merely an example, and is not limited to the above described example, and it is needless to say that a rule for determining the ID strength may be provided.

Furthermore, the ID selection unit 16 may select a workpiece having a small influence (for example, heat) due to the execution of the welding process based on the welding-related information, or may select a workpiece for which the identification sign Q is easily read in the welded workpiece (so-called weldment) produced for each welding process. For this reason, the ID selection unit 16 adopts the ID of the selected workpiece as the ID of the welded workpiece.

The identification sign arrangement unit 17 sets the arrangement position of the identification sign Q assigned to each workpiece based on the ID of the original workpiece selected and the ID of the original workpiece unselected as the ID of the welded workpiece input by the ID selection unit 16, and the design data of the welded workpiece stored in the external storage ST. When the welded workpiece is generated by executing a plurality of welding processes, the arrangement position of the identification sign Q of the original workpiece is set in accordance with the order of the welding processes. Specifically, the identification sign arrangement unit 17 sets the arrangement position of the identification sign Q to be assigned to the workpiece according to the order of the welding processes and so that the number of readable identification signs Q to be assigned to the welded workpiece after execution of each welding process is one.

The identification sign arrangement unit 17 generates a pattern for reading the ID of the workpiece for the identification sign of each workpiece. The identification sign arrangement unit 17 stores the ID of the workpiece, the information on the arrangement position of the identification sign assigned to the workpiece, and the information on the pattern generated for each identification sign in the external storage ST in association with each other, generates an execution command for assigning the identification sign based on the information on the arrangement position of the identification sign assigned to the workpiece and the information on the pattern generated for each identification sign, and transmits the execution command to the laser device 3.

Accordingly, the welding system 100 according to the first embodiment can appropriately manage the ID of the original workpiece having the ID unselected as the ID of the welded workpiece after the execution of the welding process, and can produce the weldment to which only one identification sign readable as the ID of the welded workpiece is assigned. Therefore, the user business operator limits the number of identification sign to be read at the time of reading the ID of the welded workpiece to one, thereby facilitating the ID management of the welded workpiece. Such a method of assigning the identification sign is more useful for the welded workpiece produced by executing a plurality of welding processes.

The main welding robot MC1a executes the welding process instructed from the host device 1 under the control of the robot control device 2a. The main welding robot MC1a performs, for example, arc welding in the welding process. However, the main welding robot MC1a may perform welding (for example, laser welding) other than the arc welding. In this case, although not shown, a laser head may be connected to a laser oscillator via an optical fiber instead of a welding torch 400. The main welding robot MC1a includes at least a manipulator 200, the wire feeding device 300, a welding wire 301, and the welding torch 400.

The manipulator 200 includes an articulated arm, and moves each arm based on a control signal from a robot control unit 25 (see the following description) of the robot control device 2a. Accordingly, the manipulator 200 can change a positional relationship between a workpiece Wk and the welding torch 400 (for example, an angle of the welding torch 400 with respect to the workpiece Wk) by the movement of the arm.

The wire feeding device 300 controls a feeding speed of the welding wire 301 based on a control signal (see the following description) from the robot control device 2a. The wire feeding device 300 may include a sensor capable of detecting a remaining amount of the welding wire 301.

The welding wire 301 is held by the welding torch 400. When electric power is supplied from a power supply device 4 to the welding torch 400, an arc is generated between a tip end of the welding wire 301 and the workpiece Wk, and the arc welding is performed. The illustration and description of a configuration and the like for supplying shielding gas to the welding torch 400 are omitted for the convenience of description.

The robot control device 2a controls the processing of the corresponding main welding robot MC1a (specifically, the manipulator 200, the wire feeding device 300, and the power supply device 4) based on the welding process execution command sent from the host device 1. The robot control device 2a includes at least a communication unit 20, a processor 21, and a memory 22.

The communication unit 20 is connected to enable data communication between the host device 1 and the main welding robot MC1a. Although illustration is simplified in FIG. 2, data is transmitted and received between the robot control unit 25 and the manipulator 200, between the robot control unit 25 and the wire feeding device 300, and between a power supply control unit 26 and the power supply device 4 via the communication unit 20. The communication unit 20 receives the welding process execution command transmitted from the host device 1. The communication unit 20 transmits the secondary workpiece information including the ID of the welded workpiece (secondary workpiece) produced by the welding process to the host device 1.

Here, the secondary workpiece information includes not only the ID of the welded workpiece (secondary workpiece), but also at least workpiece information (for example, the ID and name of the original workpiece, and the welding portion of the original workpiece) including the IDs of the plurality of original workpieces used in the welding process, and welding conditions at the time of execution of the welding process. The welding conditions include, for example, a material and a thickness of the original workpiece, a material and a wire diameter of the welding wire 301, a type of the shielding gas, a flow rate of the shielding gas, a set average value of a welding current, a set average value of a welding voltage, a feeding speed and a feeding amount of the welding wire 301, the number of times of welding, and a welding time. In addition to these, for example, information indicating a type of welding process (for example, TIG welding, MAG welding, or pulse welding), and a moving speed and a moving time of the manipulator 200 may be included.

The processor 21 is configured with, for example, a CPU or an FPGA, and executes various processing and controls in cooperation with the memory 22. Specifically, the processor 21 functionally implements a program generation unit 23, a calculation unit 24, the robot control unit 25, and the power supply control unit 26 by referring to a program held in the memory 22 and executing the program.

The memory 22 includes, for example, a RAM as a workpiece memory used when the processing of the processor 21 is executed, and a ROM that stores a program defining the processing of the processor 21. The RAM temporarily stores data generated or acquired by the processor 21. The program that defines processing of the processor 21 is written in the ROM. The memory 22 stores data of the welding process execution command transmitted from the host device 1, data of the secondary workpiece information including the ID of the welded workpiece (secondary workpiece) generated by the welding process, and data of welding process logical data (see FIGS. 3 and 4) of the secondary workpiece generated by the processor 21. The memory 22 stores a welding process program executed by the main welding robots MC1*a*, MC1*b*, and so on. The welding process program is a program that defines a specific procedure (process) of the welding process of joining the plurality of original workpieces using the welding conditions in the welding process. The program may be created in the robot control device 2*a*, or may be created by the host device 1, transmitted in advance, and stored in the robot control device 2*a*.

The program generation unit 23 generates a welding process program to be executed by the main welding robot (for example, the main welding robot MC1*a*) using the workpiece information (for example, the ID, the name, and the welding portion of the original workpiece) of each of the plurality of original workpieces included in the execution command based on the welding process execution command transmitted from the host device 1 via the communication unit 20. The program may include various parameters such as the welding current, the welding voltage, an offset amount, a welding speed, and a posture of the welding torch 400 for controlling the power supply device 4, the manipulator 200, the wire feeding device 300, the welding torch 400, and the like during the execution of the welding process. The generated program may be stored in the processor 21 or may be stored in the RAM in the memory 22.

The calculation unit 24 performs various calculations. For example, the calculation unit 24 performs calculation or the like for controlling the main welding robot MC1*a* (specifically, each of the manipulator 200, the wire feeding device 300, and the power supply device 4) controlled by the robot control unit 25 based on a welding process program generated by the program generation unit 23.

The robot control unit 25 drives the main welding robot MC1*a* (specifically, each of the manipulator 200, the wire feeding device 300, and the power supply device 4) based on the welding process program generated by the program generation unit 23.

The power supply control unit 26 drives the power supply device 4 based on the welding process program generated by the program generation unit 23 and a calculation result of the calculation unit 24.

In the identification sign assigning process, the laser device 3 assigns the identification sign Q on which the ID of the workpiece for each workpiece is readable based on the execution command for assigning the identification sign received from the host device 1. The laser device 3 includes a communication unit 30, a processor 31, a memory 32, and a laser oscillator 33.

The communication unit 30 is connected to the host device 1 so as to be able to communicate data with the host device 1. The communication unit 30 outputs, to the processor 31, the information on the arrangement position of the identification sign assigned to the workpiece received from the host device and the information on the pattern generated for each identification sign. The communication unit 30 transmits, to the host device 1, a notification generated when the execution of the identification sign assigning process by the laser oscillator 33 is completed.

The processor 31 is configured with, for example, a CPU or an FPGA, and executes various processing and controls in cooperation with the memory 32. Specifically, the processor 31 implements functions of the processor 31 by referring to a program held in the memory 32 and executing the program. The processor 31 generates a control signal for assigning the identification sign to the workpiece based on the received information on the arrangement position of the identification sign assigned to the workpiece and the received information on the pattern generated for each identification sign, and executes control of the laser oscillator 33.

The memory 32 includes, for example, a RAM as a workpiece memory used when the processing of the processor 31 is executed, and a ROM that stores a program defining the processing of the processor 31. The RAM temporarily stores data generated or acquired by the processor 31. The program that defines processing of the processor 31 is written in the ROM.

The laser oscillator 33 marks a pattern set at a predetermined arrangement position on the workpiece based on the execution command of assigning the identification sign received from the host device 1 for each workpiece, and executes assignment of the identification sign Q. The method of assigning the identification sign Q performed in the identification sign assigning process performed by the laser device 3 may be a known method, and the content of the method of assigning the identification sign Q is not limited.

The reading device 5 reads the identification sign Q assigned to the original workpiece used for the execution of the welding process or the welded workpiece produced by the execution of the welding process, and outputs the ID of the read workpiece. The reading device 5 is used by the user business operator. The reading device 5 includes at least a communication unit 50, a processor 51, a memory 52, a reading unit 53, and an operation unit 55. A monitor 54 may or may not be included in the reading device 5. When the monitor 54 is implemented as a configuration that is not included in the reading device 5, the monitor 54 is connected to the reading device 5 so as to be capable of wireless or wired communication. The reading device 5 may include a speaker (not shown) when the information on the ID of the workpiece is output by voice.

The communication unit 50 is connected to the host device 1 so as to be able to communicate data with the host device 1. The communication unit 50 transmits, to the host device 1, a command for requesting information on the ID of the workpiece to which the read identification sign Q is assigned, based on a result of reading the identification sign Q by the processor 51 (that is, reading the information on the pattern of the identification sign Q). The communication unit 50 receives the ID of the welded workpiece transmitted from the host device 1 and outputs the ID to the processor 51.

The processor 51 is configured with, for example, a CPU or an FPGA, and executes various processing and controls in cooperation with the memory 52. Specifically, the processor 51 implements functions of the processor 51 by referring to a program held in the memory 52 and executing the program.

The memory 52 includes, for example, a RAM as a workpiece memory used when the processing of the processor 51 is executed, and a ROM that stores a program defining the processing of the processor 51. The RAM temporarily stores data generated or acquired by the processor 51. The program that defines processing of the processor 51 is written in the ROM. The memory 52 stores the information on the identification sign Q read from the reading unit 53, the ID of the workpiece associated with the information on the identification sign Q transmitted from the host device 1, and the like.

The reading unit 53 includes, for example, a camera for reading a two-dimensional barcode or a laser for reading a barcode. The reading unit 53 reads the identification sign Q assigned to the workpiece, and outputs information (data) read from the identification sign Q to the processor 51.

The reading unit 53 implemented by using the camera is capable of reading, for example, the two-dimensional barcode, and includes at least a lens (not shown) and an image sensor (not shown). The image sensor is, for example, a solid-state imaging element of a charged-coupled device (CCD) or a complementary metal oxide semiconductor (CMOS), and converts an optical image formed on an imaging surface into an electric signal. The reading unit 53 implemented by the camera captures an image of the identification sign Q and performs image analysis on the captured identification sign Q. The reading unit 53 outputs information (data) on the identification sign Q acquired as a result of the image analysis to the processor 51.

The reading unit 53 implemented by using the laser can optically read the identification sign Q (for example, the bar code, the IC tag, or the RF tag), and specifically, receives reflected light reflected by the identification sign Q by using the laser, and replaces a color included in the reflected light with a binary digital signal to acquire the information on the identification sign Q. The reading unit 53 includes a laser and a CCD reader capable of receiving the reflected light of the laser, or a laser and radio frequency identification (RFID). The reading unit 53 outputs information (data) on the barcode read by the CCD reader or information (data) on the IC tag, the RF tag, and the like read by the RFID to the processor 51. When the reading unit 53 is implemented by the RFID, the reading unit 53 can read each of a plurality of IC tags or RF tags located in a range where radio waves reach at a time.

The monitor 54 is configured using, for example, a liquid crystal display (LCD) or an organic electroluminescence (EL). The monitor 54 outputs the ID of the workpiece received from the host device 1. The monitor 54 may be a touch interface configured by a touch panel. In such a case, the monitor 54 has a function as the operation unit 55, receives the input operation of the user business operator, generates a control signal based on the input operation, and outputs the control signal to the processor 51.

The operation unit 55 receives the input operation by the user business operator and outputs the input operation to the processor 51. The operation unit 55 generates the control signal based on the input operation by the user business operator and outputs the control signal to the processor 51. The operation unit 55 may be implemented as a touch panel of the monitor 54 described above.

FIG. 4 is an explanatory diagram showing an example of an operation outline at the time of welding using the workpiece Wk1 with the ID "A", the workpiece Wk2 with the ID "B", the workpiece Wk4 with the ID "C", and the workpiece Wk5 with the ID "D". In the example of FIG. 4, a rectangular parallelepiped workpiece Wk4 (original workpiece) having the ID "C" and a rectangular parallelepiped workpiece Wk5 (original workpiece) having the ID "D" are joined together in a second welding process to produce a welded workpiece (that is, a secondary workpiece Wk6), a cylindrical workpiece Wk1 (original workpiece) having the ID "A" and a cylindrical workpiece Wk2 (original workpiece) having the ID "B" are joined together in a first welding process to produce a welded workpiece (that is, a secondary workpiece Wk3), and the secondary workpiece Wk3 having the ID "A" and the secondary workpiece Wk6 having the ID "C" are joined together in a third welding process to produce a welded workpiece (that is, a tertiary workpiece Wk7). Similarly, the IDs "A", "B", "C", and "D" are formed of, for example, 12-digit alphabets and numerals, but are collectively represented by one alphabetic character in order to make the description of FIG. 4 easy to understand.

The ID selection unit 16 in FIG. 4 selects an ID to be adopted for each of the secondary workpiece Wk6, the secondary workpiece Wk3, and the tertiary workpiece Wk7 based on the ID strength rule. It is needless to say that the rule for selecting the ID is not limited thereto. In the example shown in FIG. 4, it is assumed that the ID selection unit 16 determines that the ID "A" is stronger than the ID "B". In this case, the ID selection unit 16 adopts and selects the stronger ID "A" as it is (that is, without changing) as the ID of the welded workpiece (that is, the secondary workpiece Wk3) which is a product of the first welding process. Similarly, it is assumed that the ID selection unit 16 determines that the ID "D" is stronger than the ID "C". In this case, the ID selection unit 16 adopts and selects the stronger ID "D" as it is (that is, without changing) as the ID of the welded workpiece (that is, the secondary workpiece Wk6) which is the product of the second welding process. Furthermore, it is assumed that the ID selection unit 16 determines that the ID "D" is stronger than the ID "A". In this case, the ID selection unit 16 adopts and selects the stronger ID "D" as it is (that is, without changing) as the ID of the welded workpiece (that is, the tertiary workpiece Wk7) which is the product of the third welding process.

The identification sign arrangement unit 17 receives, from the ID selection unit 16, information on an ID selected as an ID of each of the secondary workpieces Wk3 and Wk6 (welded workpieces) and the tertiary workpiece Wk7 (welded workpiece) produced by the first welding process to the third welding process. The identification sign arrangement unit 17 sets the arrangement positions of the identification signs of the plurality of workpieces Wk1, Wk2, Wk4, and Wk5 (original workpieces) based on the IDs of the plurality of workpieces Wk1, Wk2, Wk4, and Wk5 (original workpieces), information on the IDs selected as welded workpieces produced by the welding processes, information on the order in which the welding processes are executed, and information on joint surfaces to be joined in the welding processes.

Specifically, the identification sign arrangement unit 17 sets the arrangement positions so that an entire of the identification sign Q3 on which the ID of the unselected workpiece Wk4 (original workpiece) is readable are assigned in the joint surface to be joined in the first welding process. Similarly, the identification sign arrangement unit 17 sets the arrangement positions so that an entire of the identification sign Q2 on which the ID of the unselected workpiece Wk2 (original workpiece) is readable are assigned in the joint surface to be joined in the second welding process. Further, the identification sign arrangement unit 17 sets the arrangement positions so that an entire of the identification sign Q1 on which the ID of the unselected workpiece Wk1 (original workpiece) is readable are assigned in the joint surface to be joined in the third welding process, and sets the identification sign on which the ID of the tertiary workpiece Wk7 (welded workpiece) is readable to the identification sign Q4 only. Accordingly, since only one identification sign readable as the ID of the welded workpiece is assigned to the welded workpiece produced by the welding system 100 according to the first embodiment, it is not necessary to consider any one of the identification signs read when the ID is read by the user business operator. Such a method of assigning (arranging) the identification sign is more useful for the welded workpiece which is produced by executing a plurality of welding processes shown in FIG. 4.

However, when the ID "D" of the workpiece Wk5 (original workpiece), the ID "D" of the welded workpiece (that is, the secondary workpiece Wk6), and the ID "D" of the tertiary workpiece Wk7 are all the same, the management of the ID "D" among the workpiece Wk1 (original workpiece), the secondary workpiece Wk3, and the tertiary workpiece Wk7 may be complicated. Furthermore, since the identification signs assigned to the secondary workpieces Wk3 and Wk6 (welded workpieces) and the tertiary workpiece Wk7 (welded workpiece) are only the identification signs that enable the ID of the selected original workpiece to be read, it is not possible to read the information on the ID of the original workpiece or the ID of the workpiece unselected after the execution of each welding process. Therefore, in the welding system 100 according to the first embodiment, for example, when the host device 1 receives the notification of the completion of the welding process, in the first welding process to the third welding process, the host device 1 generates the welding process logical data (see FIG. 4) logically indicating a mutual relationship between the strongest ID "D" and other weak IDs "A", "B", and "C", generates a record TB1 in which the ID "D" of the tertiary workpiece Wk7 and the welding process logical data are associated with each other, and stores the record TB1 in the external storage ST.

The welding process logical data indicates, as viewed from the ID "D" of the tertiary workpiece Wk7, which ID the original workpiece having which ID is used in which the welding process the tertiary workpiece Wk7 is used and produced, and also indicates a strength relationship of the IDs of the plurality of original workpieces used in each of the welding processes, and a temporal order in which each process is executed. For example, the welding process logical data indicates that the tertiary workpiece Wk7 having the ID "D" is produced through three welding processes (the first welding process to the third welding process). In the second welding process, the workpiece Wk1 (original workpiece) having the ID "A" and the workpiece Wk2 (original workpiece) having the ID "B" are welded to each other, and since the ID "A" is stronger than the ID "B", the ID "A" is selected as the ID of the secondary workpiece Wk3. In the first welding process, the workpiece Wk4 (original workpiece) having the ID "C" and the workpiece Wk5 (original workpiece) having the ID "D" are welded, and since the ID "D" is stronger than the ID "C", the ID "D" is selected as the ID of the secondary workpiece Wk6. In the third welding process, the secondary workpiece Wk3 having the ID "A" and the secondary workpiece Wk6 having the ID "D" are welded to each other, and since the ID "A" is strong, the ID "A" is selected as the ID of the tertiary workpiece Wk7. In the welding process logical data, when viewed from the ID "D" of the tertiary workpiece Wk7, a position closer to the ID "D" indicates that a time at which the workpiece Wk5 (original workpiece) or the secondary workpiece Wk6 of the ID "D" is welded is older, and a position farther from the ID "D" indicates that the time at which the workpiece Wk5 (original workpiece) or the secondary workpiece Wk6 of the ID "D" is welded is newer. Accordingly, even after all of the plurality of welding processes are completed, the user business operator can comprehensively grasp the data on the plurality of original workpieces used for the production of the tertiary workpiece Wk7 without losing the information on the original workpiece or the secondary workpiece of the ID that is unreadable in each welding process.

Figure 5:
FIG. 5 is a diagram showing an example of a correspondence table between IDs of selected welded workpieces and management IDs.

FIG. 5 is a diagram showing an example of a correspondence table XTB1 between a selection ID and a management ID. When a business operator (hereinafter, referred to as the "user business operator") who executes the welding process starts the welding process, an original workpiece such as a steel material used in the welding process may be supplied (in other words, may be outsourced) from the supplier in advance. For this reason, when the user business operator outsources the original workpiece such as the steel material, an ID is often assigned to the original workpiece in advance at an outsource destination. In the following description, the ID of the original workpiece assigned in advance in the outsource destination as described above is referred to as a "selection ID". When the supplied original workpiece is assigned a selection ID unique to the outsource destination, the use of the selection ID may not be suitable in terms of the management of the user business operator.

Therefore, as shown in FIG. 5, in the welding system 100 according to the first embodiment, when the selection ID is assigned to each of one or more original workpieces to be supplied from the outsource destination, the correspondence table XTB1 (an example of the management table) indicating a relationship between the selection ID and the management ID of the user business operator is created by the user business operator and stored in the external storage ST. The correspondence table XTB1 may be stored in the memory 12 of the host device 1.

For example, in the correspondence table XTB1 of FIG. 5, it is assumed that the user business operator supplies a plurality of original workpieces of the same type (for example, the same material supplied from the same supplier) from the outsource destination, and the management IDs "AAA001", "BBB001", "DDD001", and the like corresponding to the selection IDs "RX85-1001", "RX85-1002", "RR90-0001", and the like unique to the outsource destination are defined. "RX85-1001", "RX85-1002", "RR90-0001", and so on are of the same type because "RX85" before hyphen in the ID is common, and are different from each other in branch number of "RX85" (number after the hyphen in the ID), so that the original workpieces (parts) are different.

(Arrangement Setting of Identification Sign)

Figure 6:
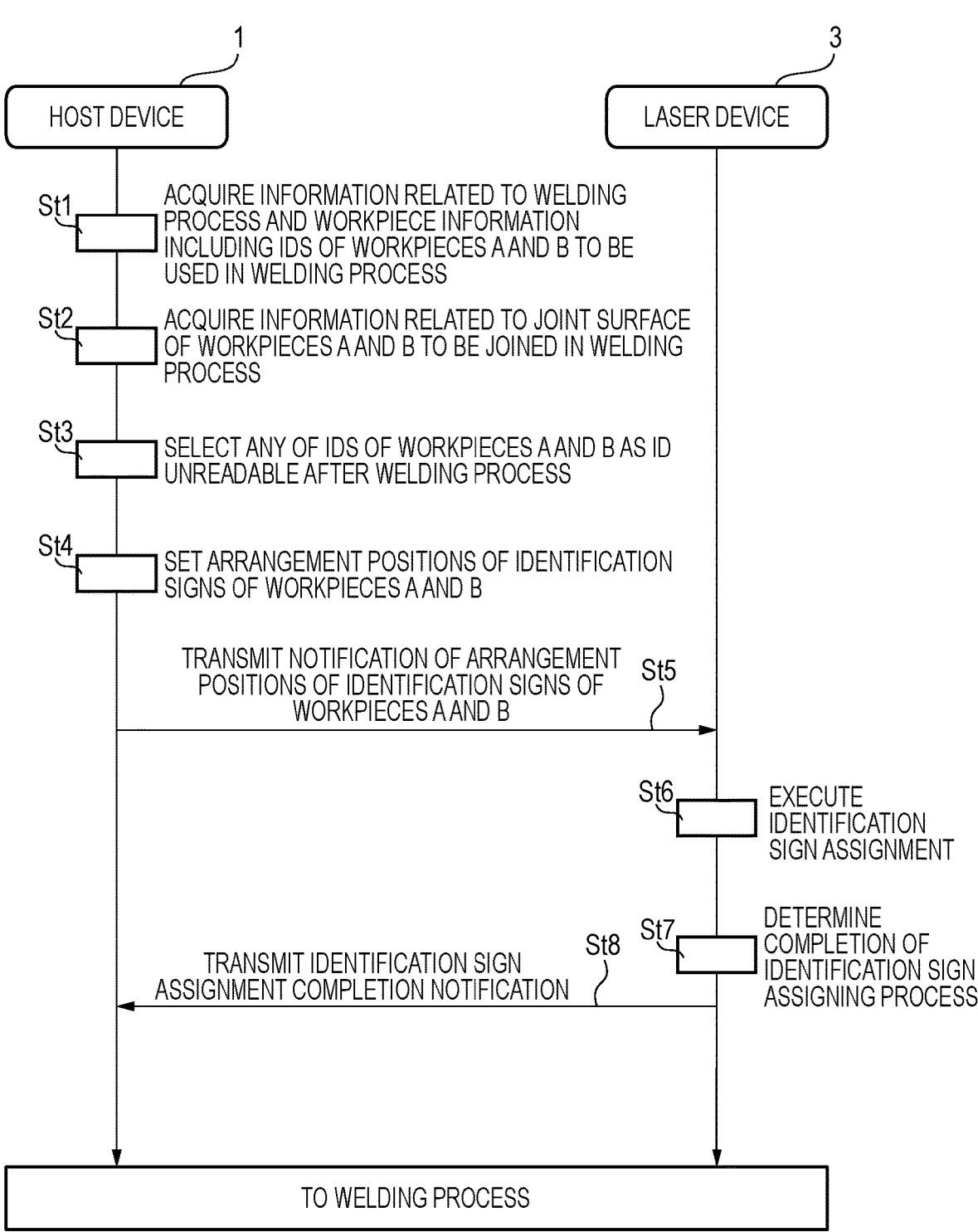
FIG. 6 is a sequence diagram showing an arrangement setting procedure of an identification sign in the welding system according to the first embodiment.

Next, an arrangement setting procedure of the identification sign by the welding system 100 according to the first embodiment will be described with reference to FIG. 6. FIG. 6 is a sequence diagram showing an arrangement setting procedure of the identification sign in the welding system 100 according to the first embodiment. In the description of FIG. 6, the arrangement setting procedure of the identification sign performed between the host device 1 and the laser device 3 in the second welding process using the plurality of workpieces Wk1 and Wk2 (original workpieces) shown in FIG. 4 will be described as an example. The workpiece A shown in FIG. 6 is the workpiece Wk1 (original workpiece) having the ID "A". Similarly, the workpiece B shown in FIG. 6 is the workpiece Wk2 (original workpiece) having the ID "B".

In FIG. 6, the host device 1 acquires information (for example, the number of welding processes, and the order of the welding processes) related to the welding process (main welding) and workpiece information (for example, the ID, the name, and the welding portion of the original workpiece)

including IDs of the plurality of workpieces Wk1 and Wk2 (original workpieces) to be subjected to the welding process (St1), and further acquires information related to a joint surface of the plurality of workpieces Wk1 and Wk2 (original workpieces) to be joined (used) by the welding process for producing the welded workpiece (that is, the secondary workpiece Wk3) (St2). Here, the information related to the joint surfaces of the plurality of workpieces Wk1 and Wk2 (original workpieces) is, for example, design data of the welded workpiece in which the plurality of workpieces Wk1 and Wk2 (original workpieces) are joined in the welding process, or design data of each of the plurality of workpieces Wk1 and Wk2 (original workpieces).

The host device 1 selects an ID to be adopted as the ID of the secondary workpiece Wk3 (that is, the welded work-piece) after the welding process based on a predetermined rule (St3). The ID "A" of the secondary workpiece Wk3 (welded workpiece) selected here may be stored in the memory 12 of the host device 1. The host device 1 sets the arrangement positions of the identification signs assigned to the plurality of workpieces Wk1 and Wk2 (original work-pieces), respectively, based on the information on the ID "A" selected by the processing of step St3 and the unselected ID "B", and the information on the joint surfaces of the plurality of workpieces Wk1 and Wk2 (original workpieces) to be joined (St4). The host device 1 notifies the laser device 3 of the information on the arrangement position of the identi-fication sign and the information on the pattern of the identification sign assigned to each of the plurality of set workpieces Wk1 and Wk2 (original workpieces) (St5).

Based on the notification received from the host device 1, the laser device 3 executes an assigning process of assigning an identification sign Q1 to the workpiece Wk1 (original workpiece), executes an assigning process of assigning an identification sign Q2 to the workpiece Wk2 (original work-piece) (St6), and when completion of the assigning process of the identification sign is determined (St7), generates an identification sign assignment completion notification indi-cating that the assignment of the identification sign is completed, and transmits the identification sign assignment completion notification to the host device 1 (St8). The processing of steps St6 to St8 may be executed indepen-dently for each original workpiece.

As described above, the welding system 100 according to the first embodiment can produce a weldment to which only one readable identification sign is assigned as the ID of the welded workpiece. Therefore, the user business operator limits the number of identification signs to be read at the time of reading the ID of the welded workpiece to one, thereby facilitating the ID management of the welded work-piece. Such a method of assigning the identification sign is more useful for the welded workpiece produced by execut-ing a plurality of welding processes. The arrangement set-ting procedure of the identification sign shown in FIG. 6 is an example, and a processing order of the arrangement setting procedure is not limited thereto.

(Operation of Welding System)

Figure 7:
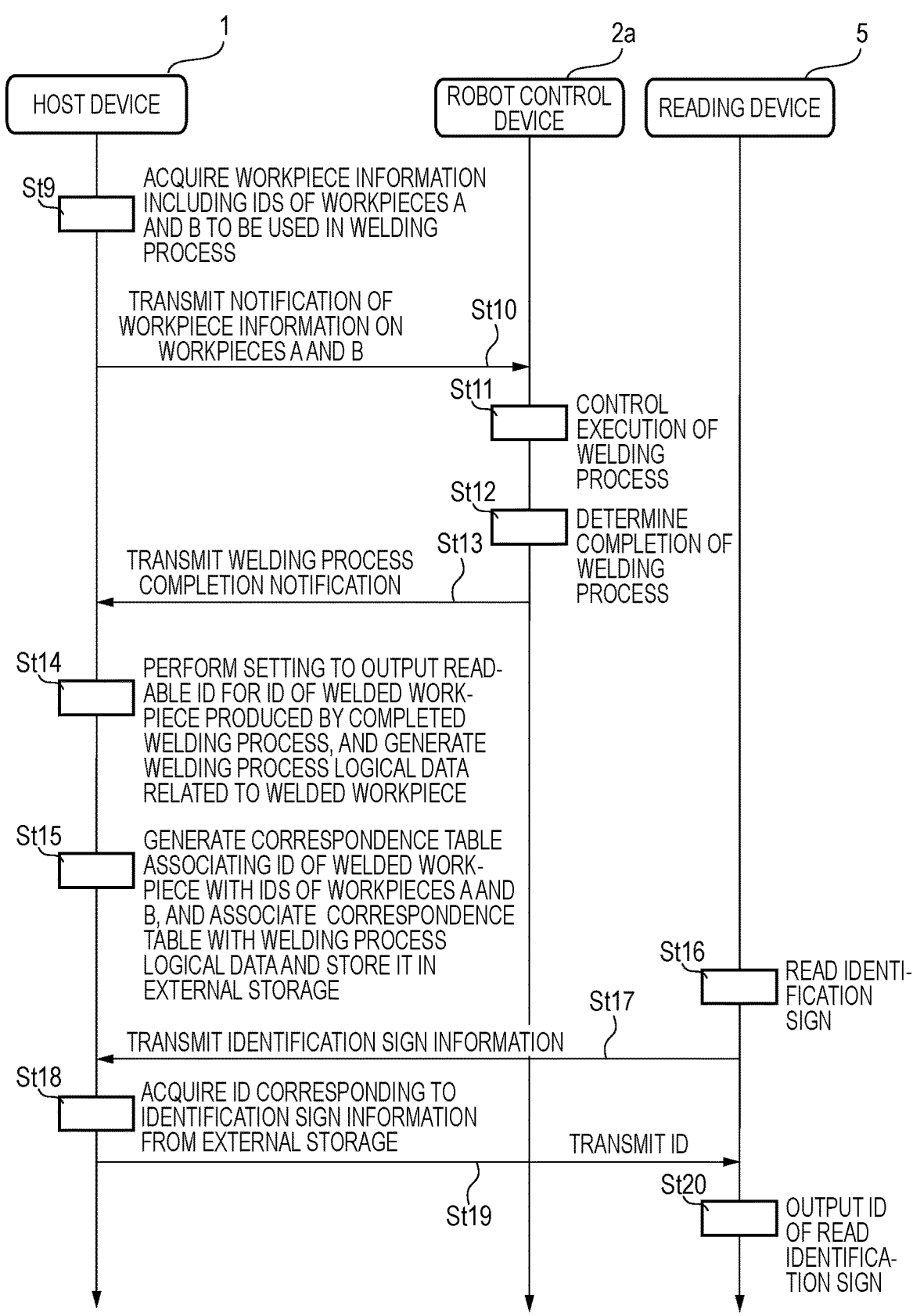
FIG. 7 is a sequence diagram showing an example of an operation procedure of ID management in the welding system according to the first embodiment.

Next, an operation procedure of the ID management by the welding system 100 according to the first embodiment will be described with reference to FIG. 7. FIG. 7 is a sequence diagram showing an operation procedure example of the ID management in the welding system 100 according to the first embodiment. In the description of FIG. 7, an operation procedure performed among the host device 1, the robot control device 2a, and the reading device 5 with respect to the second welding process using the plurality of workpieces Wk1 and Wk2 (original workpieces) shown in FIG. 4 will be described as an example, and an operation procedure performed among other robot control devices 2b will be omitted. The workpiece A shown in FIG. 7 is the workpiece Wk1 (original workpiece) having the ID "A". Similarly, the workpiece B shown in FIG. 7 is the workpiece Wk2 (original workpiece) having the ID "B".

In FIG. 7, the host device 1 acquires workpiece informa-tion (for example, the ID, the name of the workpiece, the arrangement position of the identification sign, and the welding portion of the original workpiece) including the IDs of the plurality of workpieces Wk1 and Wk2 (original workpieces) to be subjected to the welding process (main welding) (St9), and transmits a second welding process execution command including the workpiece information on the workpiece Wk1 (original workpiece) and the workpiece information on the workpiece Wk2 (original workpiece) to the robot control device 2a (St10).

When the robot control device 2a receives the welding process execution command transmitted from the host device 1, the robot control device 2a causes the main welding robot MC1a to execute the main welding in accor-dance with the workpiece information on each of the plu-rality of workpieces Wk1 and Wk2 (original workpieces) included in the execution command and the welding process program executed by the main welding robot MC1a received together with the welding process execution com-mand (SW). The robot control device 2a determines the completion of the main welding (welding process) by the main welding robot MC1a by various known methods (St12), generates a main welding completion notification indicating the completion of the main welding, and transmits the notification to the host device 1 (St13).

When the main welding completion notification indicat-ing that the main welding is completed is received from the robot control device 2a, the host device 1 sets the ID "A" selected in the processing of step St3 as the ID of the secondary workpiece Wk3 (welded workpiece), and gener-ates the welding process logical data (see FIG. 4) related to the secondary workpiece Wk3 (welded workpiece) (St14). The host device 1 stores the information including the ID "A" of the secondary workpiece Wk3 (welded workpiece), the ID "B" of the unselected workpiece Wk2 (original workpiece), and the welding process logical data related to the secondary workpiece Wk3 (welded workpiece) in the external storage ST in association with each other (St15).

The reading device 5 reads the identification sign Q1 assigned to the secondary workpiece Wk3 (welded work-piece) produced by the completion of the main welding (St16), and transmits information on the read identification sign to the host device 1 (St17).

The host device 1 refers to the external storage ST based on the information on the identification sign Q1 received from the reading device 5, and acquires the information on the ID "A" as the ID of the secondary workpiece Wk3 (welded workpiece) associated with the information on the identification sign Q1 (St18). The host device 1 transmits the acquired ID "A" of the secondary workpiece Wk3 (welded workpiece) to the reading device 5 (St19).

The reading device 5 outputs (displays) the ID "A" of the secondary workpiece Wk3 (welded workpiece) which is received from the host device 1 and is associated with the identification sign Q2 read in the processing of step St9 (St20).

In FIG. 7, an example in which the reading device 5 reads the identification sign Q1 of the secondary workpiece Wk3 (welded workpiece) after the execution of the second weld-ing process is described, whereas a timing of reading the identification sign is not limited thereto. For example, the user business operator may execute the reading of the identification sign Q2 of the workpiece Wk2 (original workpiece) in view of a fact that the identification sign Q2 of the workpiece Wk2 (original workpiece) cannot be read after the execution of the second welding process. The user business operator may read the identification sign Q1 of the workpiece Wk1 (original workpiece) and the identification sign Q2 of the workpiece Wk2 (original workpiece) before the execution of the second welding process, and may read the identification sign Q1 of the secondary workpiece Wk3 (welded workpiece) after the execution of the second welding process.

Accordingly, the welding system 100 according to the first embodiment can appropriately manage the ID of the original workpiece having the ID unselected as the ID of the welded workpiece after the execution of the welding process, and can produce the weldment to which only one identification sign readable as the ID of the welded workpiece is assigned. Therefore, the user business operator limits the number of identification signs to be read at the time of reading the ID of the welded workpiece to one, thereby facilitating the ID management of the welded workpiece. Such a method of assigning the identification sign is more useful for the welded workpiece produced by executing a plurality of welding processes.

As described above, the welding system 100 according to the first embodiment in which the identification signs are arranged on the plurality of original workpieces to be used in the welding process, respectively, the identification signs on which identifiers of the respective original workpieces are readable, executes the welding process such that a part or an entire of the identification sign is hidden in the joint surface on which the plurality of original workpieces are joined by the welding process.

Accordingly, since only one identification sign readable as the ID of the welded workpiece is assigned to the welded workpiece produced by the welding system 100 according to the first embodiment, it is not necessary to consider any one of the identification sign read when the ID is read by the user business operator, and it is possible to support more efficient management of the identifier of the workpiece produced in the process of welding or the like.

The identifier in the welding system 100 according to the first embodiment selects, according to a predetermined rule, any one of the identifiers of the plurality of original workpieces to be adopted as the identifier of the welded workpiece to be produced by the welding process, and after the selection, the welding process is executed so as to hide a part or an entire of the identification sign of the original workpiece having the identifier that has not been selected as the identifier of the welded workpiece. Accordingly, the welding system 100 according to the first embodiment can easily and efficiently set the identifier to be adopted as the identifier of the welded workpiece based on the predetermined rule. Further, the welding system 100 according to the first embodiment can set the identification sign readable by the reading device 5 to the selected identification sign by executing the welding process so as to hide a part or an entire of the identification sign of the original workpiece having the identifier that is not set as the identifier of the welded workpiece. Therefore, it is possible to easily and efficiently manage the ID of the welded workpiece (for example, the secondary workpiece).

In the welding system 100 according to the first embodiment, each of the IDs includes a combination of a plurality of character codes, and is selected according to the ID strength rule defined for each type of character code. Specifically, the ID strength rule is defined for adopting an ID having a strong character code based on a comparison of strength among character codes constituting the IDs of the plurality of original workpieces included in the workpiece. The character codes include, for example, an alphabet and a number. Accordingly, the welding system 100 can easily set and manage the ID of the welded workpiece (for example, the secondary workpiece).

The welding system 100 according to the first embodiment acquires information on the identifier of each of the plurality of original workpieces after selecting the identifier of the welded workpiece. Accordingly, the user business operator can acquire and manage the IDs of the plurality of original workpieces without considering the welded workpiece to which the identification sign that becomes unreadable after the execution of the welding process is assigned.

The welding system 100 according to the first embodiment acquires information on the identifier which has not been selected after the identifier of the welded workpiece is selected. Accordingly, the user business operator can acquire only the ID of the original workpiece to which the identification sign that becomes unreadable after the execution of the welding process is assigned, and can omit reading and management of the identification sign of the workpiece having the same ID before and after the execution of the welding process.

The welding system 100 according to the first embodiment reads the identification signs assigned to the respective original workpieces to be used in the production of the welded workpiece, and generates and stores data (welding process logical data) indicating the relationship between the identifier that has been selected and the identifier that has not been selected. Accordingly, the welding system 100 according to the first embodiment can appropriately manage the ID of the original workpiece having the ID unselected as the ID of the welded workpiece after the execution of the welding process, and can produce the weldment to which only one identification sign readable as the ID of the welded workpiece is assigned. Therefore, the user business operator limits the number of identification sign to be read at the time of reading the ID of the welded workpiece to one, thereby facilitating the ID management of the welded workpiece. Such a method of assigning the identification sign is more useful for the welded workpiece produced by executing a plurality of welding processes. Therefore, even after all of the plurality of welding processes are completed, the user business operator can comprehensively grasp the data on the plurality of original workpieces used in the plurality of welding processes without losing the information on the original workpiece or the secondary workpiece of the ID that is unreadable in each welding process.

In the welding system 100 according to the first embodiment, in a case in which the welding process includes a plurality of welding processes, the data indicates the temporal order of the plurality of welding processes. Accordingly, the welding system 100 according to the first embodiment can visualize the relationship between the plurality of original workpieces used in the production of each of the plurality of welding processes, and can support more efficient management of the identifier of the workpiece produced in the process such as welding. Therefore, the user business operator can grasp the relationship between the plurality of original workpieces used in the production of each of the plurality of welding processes, and can comprehensively grasp the data on the plurality of original workpieces used in the plurality of welding processes without losing the information on the original workpiece or the secondary workpiece of the ID that is unreadable in each welding process.

As described above, the identification sign assignment device (that is, the laser device 3) in the welding system 100 according to the first embodiment is a device that assigns an identification sign to a plurality of original workpieces to be used in a welding process executed by the welding system, and includes the communication unit 30 that acquires welding information including information on an identifier of the respective original workpieces and information on an identifier that is not selected as an identifier of a welded workpiece to be produced in the welding process among the identifiers of the plurality of original workpieces, and the processor 31 that controls the laser oscillator 33 that assigns identification signs on which identifiers corresponding to the respective original workpieces are readable based on the received welding information. Among the identification signs assigned by the identification sign assignment device, the identification sign of the original workpiece having the identifier that is not selected as the identifier of the welded workpiece is assigned such that a part or an entire of the identification sign is located on the joint surface on which the plurality of original workpieces are joined by the welding process.

Accordingly, the welded workpiece produced by the welding system 100 according to the first embodiment is produced with only one identification sign that is readable as the ID of the welded workpiece being assigned. Therefore, the user business operator limits the number of identification signs to be read at the time of reading the ID of the welded workpiece to one, thereby facilitating the ID management of the welded workpiece.

In a case in which a plurality of welding processes are performed by the welding system 100 according to the first embodiment, the identification sign of the original workpiece having the identifier that is not selected for each welding process is assigned so as to be partially or entirely hidden. Accordingly, the welding system 100 according to the first embodiment can similarly produce the welded workpiece, which is produced by executing the plurality of welding processes, by assigning only one identification sign readable as the ID of the welded workpiece. Therefore, the user business operator limits the number of identification signs to be read at the time of reading the ID of the welded workpiece to one, thereby facilitating the ID management of the welded workpiece.

As described above, the weldment produced by the welding system 100 according to the first embodiment is a weldment produced by the execution of the welding process by the welding system, and is produced by the process of arranging the identification signs on which the information on the identifiers of the plurality of original workpieces to be used in the welding process is readable, and the process of executing the welding process based on the position information on the joint surface so as to hide a part or an entire of the identification sign assigned at the position of the joint surface on which the plurality of original workpieces are joined in the welding process.

Accordingly, since only one identification sign readable as the ID of the welded workpiece is assigned to the welded workpiece (weldment) produced by the welding system 100 according to the first embodiment, it is not necessary to consider any one of the identification sign read when the ID is read by the user business operator, and it is possible to support more efficient management of the identifier of the workpiece produced in the process of welding or the like.

Second Embodiment

In the welding system 100 according to the first embodiment, the example in which the identification sign Q is read by the reading device 5 (that is, the example in which the ID of the workpiece is read by the reading device 5) is described. In the welding system 100 according to the second embodiment, an example will be described in which the main welding robot further includes a reading unit capable of reading information on the identification sign Q assigned to the workpiece, and the robot control device has an ID reading function.

Figure 8:
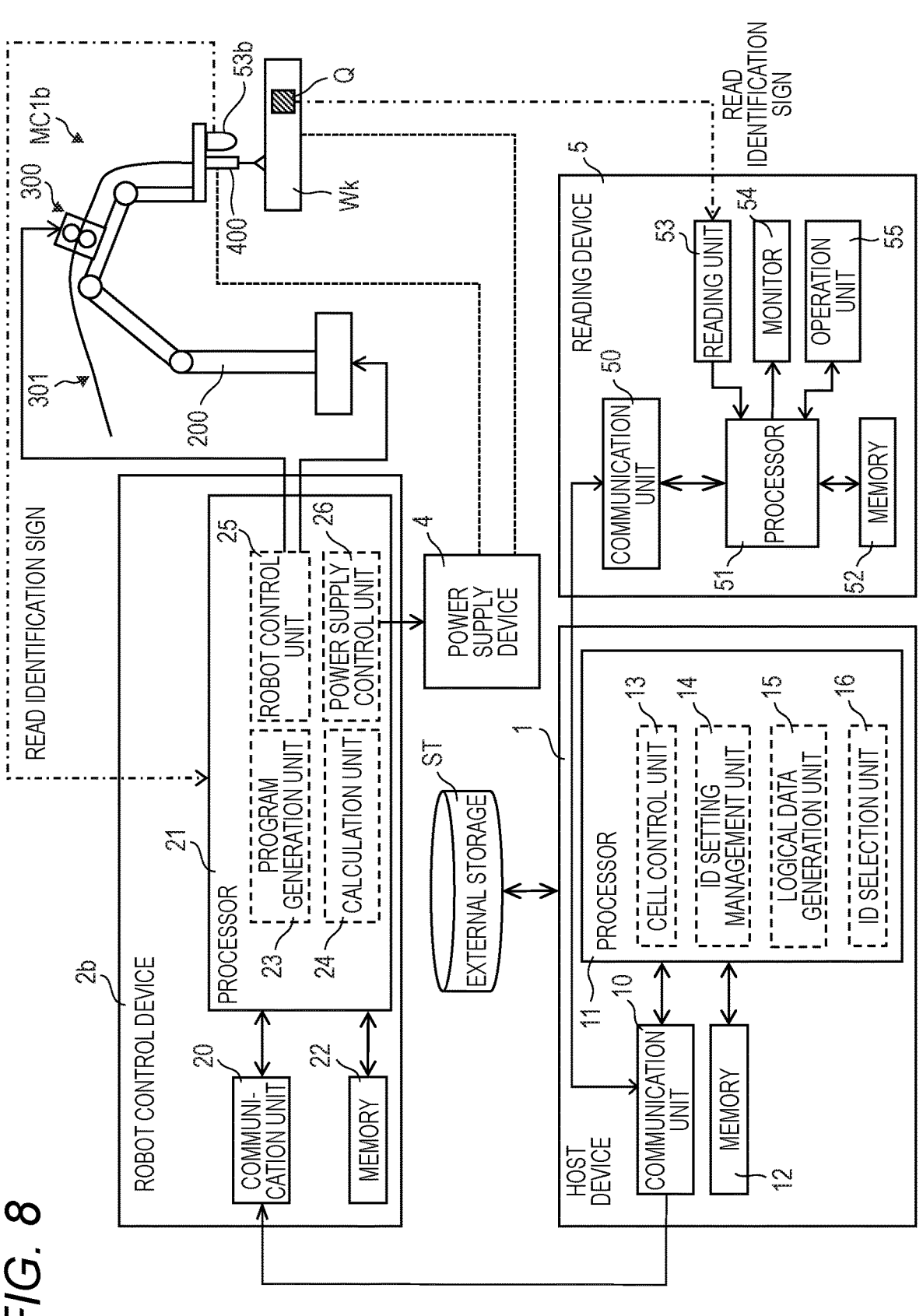
FIG. 8 is a diagram showing an internal configuration example of a host device, a robot control device, and a reading device according to a second embodiment.

FIG. 8 is a diagram showing an internal configuration example of the host device 1 and the robot control device 2b according to the second embodiment. The welding system 100 according to the second embodiment has substantially the same configuration as the welding system 100 according to the first embodiment. Therefore, the same components as those of the first embodiment are denoted by the same reference numerals, and a description thereof will be omitted. In the description of FIG. 8, in order to make the description easy to understand, illustration of the monitor MN1 and the input interface UI1 is omitted, the main welding robot MC1b among the main welding robots MC1a, MC1b, and so on is exemplified, and further, the robot control device 2b among the robot control devices 2a, 2b, and so on is exemplified and described.

In the welding system 100 according to the second embodiment, the robot control device and the main welding robot having the function of reading the identification sign may be a part of the robot control device and the main welding robot selected by the user business operator. That is, in the welding system 100 according to the second embodiment, all of the robot control devices 2a, 2b, and so on and the main welding robots MC1a, MC1b, and so on do not have to have the function of reading the identification sign.

The main welding robot MC1b executes the welding process and the reading of the identification sign Q instructed from the host device 1 under the control of the robot control device 2b. Before the welding process, the main welding robot MC1b executes reading of the identification sign Q assigned to each of the plurality of original workpieces using a reading unit 53b, and transmits information on the read identification sign Q to the robot control device 2b. After reading the identification sign Q, the main welding robot MC1b proceeds to the welding process, and performs, for example, arc welding in the welding process. The main welding robot MC1b may perform welding (for example, laser welding) other than the arc welding.

The manipulator 200 includes an articulated arm, and moves each arm based on a control signal from the robot control unit 25 of the robot control device 2b. Accordingly, the manipulator 200 can change the positional relationship between the reading unit 53b and the identification sign Q assigned to the workpiece Wk and the positional relationship between the workpiece Wk and the welding torch 400 by the movement of the arm.

The host device 1 generates an execution command for executing reading of the identification sign Q of each of the plurality of original workpieces based on the position information on the identification sign Q assigned to each of the plurality of original workpieces used in the welding process, and transmits the execution command to the robot control device 2b. The host device 1 generates a welding process execution command using each of the plurality of original workpieces by using the welding-related information input or set in advance by the user business operator, and transmits the execution command to the robot control device 2b.

The processor 11 in the host device 1 according to the second embodiment refers to the external storage ST based on a reading result of the identification sign Q read by the reading unit 53b, and acquires the information on the ID of the workpiece to which the read identification sign Q is assigned. The processor 11 outputs the acquired workpiece ID to the monitor MN1. The processor 11 may transmit the acquired workpiece ID to the reading device 5 and cause the reading device 5 to display the acquired workpiece ID.

The reading unit 53b includes, for example, a camera for reading a two-dimensional barcode or a laser for reading a barcode. The reading unit 53b reads the identification sign Q assigned to the workpiece, and outputs information (data) read from the identification sign Q to the processor 21.

As described above, the welding system 100 according to the second embodiment can not only read the identification sign Q using the reading device 5 but also read the identification sign Q using the main welding robot MC1b. Accordingly, the welding system 100 according to the second embodiment can read the IDs of a plurality of original workpieces or welded workpieces from the identification sign Q assigned to the workpiece Wk, for example, before, after, or both before and after the welding process, can display the read IDs of the workpieces on the reading device 5 owned by the user business operator, and can more efficiently read the IDs of the workpieces.

Since the ID of the workpiece can be read by the robot control device 2b and the reading device 5, the user business operator can select which of the robot control device 2b and the reading device 5 reads the ID of the workpiece in accordance with a production process of the welded workpiece, such as a case where there are a plurality of welding processes or a case where the welding process is executed in a different cell.

Although the various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Further, components in the various embodiments described above may be combined optionally in the range without deviating from the spirit of the invention.

The present application is based on Japanese Patent Application (Japanese Patent Application No. 2019-188154) filed on Oct. 11, 2019, and contents thereof are incorporated herein by reference.

The present disclosure is useful as a welding method, an identification sign assignment device, and a weldment that support more efficient management of an identifier of a workpiece produced in a process such as welding.

The invention claimed is:

1. A welding method to be executed by a welding system, wherein identification signs are arranged on a plurality of original workpieces to be used in a welding process, respectively, the identification signs on which identifiers of the respective original workpieces are readable, the welding method comprising:

executing the welding process such that a part or an entirety of an identification sign of one of the plurality of original workpieces is hidden by another of the plurality of original workpieces that are joined in the welding process, wherein the identifiers of the respective original workpieces distinguish the original workpieces from each other.

2. The welding method according to claim 1, further comprising:

selecting, according to a predetermined rule, any one of the identifiers of the plurality of original workpieces to be adopted as an identifier of a welded workpiece to be produced in the welding process, wherein the executing comprises executing, after the selecting, the welding process so as to hide the part or the entirety of the identification sign of the one of the original workpieces having an identifier that has not been selected as the identifier of the welded workpiece.

3. The welding method according to claim 2, wherein each of the identifiers comprises a combination of a plurality of character codes, and wherein the predetermined rule comprises adopting an identifier having a strong character code based on a comparison of strength among character codes constituting the identifiers of the plurality of original workpieces included in the welded workpiece according to a strength rule defined for each type of the character codes.

4. The welding method according to claim 2, further comprising:

acquiring, after the selecting, information on the identifiers of the respective original workpieces.

5. The welding method according to claim 2, further comprising:

acquiring, after the selecting, information on the identifier which has not been selected.

6. The welding method according to claim 2, further comprising:

reading the identification signs assigned to the respective original workpieces to be used in production of the welded workpiece; and generating and storing data indicating a relationship between the identifier that has been selected and the identifier that has not been selected.

7. The welding method according to claim 6, wherein in a case in which the welding process comprises a plurality of welding processes, the data indicates a temporal order of the plurality of welding processes.

8. The welding method according to claim 1, wherein each of the original workpieces has a unique identification sign.

9. An identification sign assignment device configured to assign identification signs to a plurality of original workpieces to be used in a welding process executed by a welding system, respectively, the identification sign assignment device comprising:

a communication unit configured to acquire welding information comprising information on identifiers of the respective original workpieces and information on an identifier that is not selected as an identifier of a welded workpiece to be produced in the welding process among the identifiers of the plurality of original workpieces; and a processor configured to control a laser oscillator to mark the plurality of original workpieces with the identification signs based on the acquired welding information, the identification signs on which information on the identifiers corresponding to the respective original workpieces are readable, wherein the identification signs are marked on the plurality of original workpieces such that a part or an entirety of an identification sign of one of the plurality of original workpieces having the identifier that is not selected as the identifier of the welded workpiece is hidden by another of the plurality of original workpieces that are joined by the welding process, and wherein the identifiers of the respective original workpieces distinguish the original workpieces from each other.

10. The identification sign assignment device according to claim 9, wherein in a case in which a plurality of welding processes are executed by the welding system, the identification sign of the original workpiece having the identifier that is not selected for each of the plurality of welding processes is assigned so as to be partially or entirely hidden.

11. A weldment produced by execution of a welding process by a welding system, the weldment comprising:

a plurality of original workpieces having identification signs arranged thereon, the identification signs on which identifiers of the respective original workpieces are readable, wherein the plurality of original workpieces are welded together by a welding process using a welder such that a part or an entirety of an identification sign of one of the plurality of original workpieces is hidden by another of the plurality of original workpieces, and wherein the identifiers of the respective original workpieces distinguish the original workpieces from each other.

\* \* \* \* \*